Feb. 27, 1962 W. H. SWAIN 3,023,377

FREQUENCY MODULATION SYSTEMS

Filed Dec. 29, 1958 2 Sheets-Sheet 1

William H. Swain
INVENTOR.

BY William R. Sherman

ATTORNEY

William H. Swain
INVENTOR.

BY William R. Sherman

ATTORNEY

United States Patent Office 3,023,377

Patented Feb. 27, 1962

3,023,377

FREQUENCY MODULATION SYSTEMS

William H. Swain, Sarasota, Fla., assignor to Electro-Mechanical Research, Inc., Sarasota, Fla., a corporation of Connecticut Filed Dec. 29, 1958, Ser. No. 783,227

16 Claims. (Cl. 332—23)

This invention relates to frequency modulation systems and, more particularly, to systems for producing a carrier signal, the frequency of which is varied in linear proportion to a modulating signal.

Frequency modulation systems presently have a wide variety of uses including, for example, telemetering data from air-borne devices to ground stations. The data is commonly manifested by a signal having a frequency in the audio frequency range and extending as low as zero frequency. In such systems, an oscillator is employed for producing a frequency modulated carrier or subcarrier wherein the deviation of the carrier frequency from a reference or center value varies with the data-representing potential or current. The accuracy of data transmission depends upon constancy of the center frequency and linearity of the "gain" relationship between the carrier frequency deviations and the modulating signal representing the data.

To effect a modulation of the oscillator frequency, reactance tubes, dynamic-plate-resistance modulators, or variable gain amplifiers are generally used but such devices exhibit a relatively high degree of center frequency instability as a result of changes in electrode potentials and tube ageing. For example, changes in plate supply or heater voltage will materially change the reflected reactance of a reactance tube modulator and alter both the center frequency and the "gain" of the modulator. The use of degenerative feedback to stabilize such devices encounters the disadvantage of a sharply reduced modulator "gain."

The attainment of very high stability of center frequency and high accuracy of frequency modulations has, therefore, been confined to laboratory environments where regulated temperatures and power supplies are available and complex circuits may be accommodated employing many vacuum tubes to stabilize the center frequency and to extend the range of linear response. The attainment of a like degree of accuracy in air-borne components of frequency modulation systems has long been sought, inasmuch as the accuracy of the data transmitted is limited primarily by the airborne components of the telemetering link, particularly the FM oscillator.

It is, therefore, an object of the present invention to provide new and improved frequency modulation systems for producing a carrier signal which is stable in the absence of any modulating signal and has a deviation in frequency which is proportional to the amplitude of the modulating signal over a wide range of amplitude and frequency.

Another object of this invention is to provide new and improved frequency modulation systems of the foregoing character which are responsive to extremely small modulating currents for producing wide frequency deviations with a high degree of stability, both with respect to zero setting and deviation gain.

A further object of the invention is to provide frequency modulation systems of such character which are reliable with changes in temperature over a wide range.

Yet another object of the invention is to provide new and improved frequency modulation systems of the foregoing character which are highly reliable, even at extremes of temperature, vibration and shock, readily packaged in a small volume, and have low power requirements, so as to be well suited for airborne operation.

In accordance with the invention, a frequency modulation system is provided which includes an oscillator circuit and a modulator circuit for deviating the frequency of oscillations in response to a modulating signal. The oscillator has its frequency determined in response to a modulating current by a circuit including a balanced pair of semiconductor circuit elements. Such elements are biased for operation in a forward conduction range characterized by a linear correspondence between incremental conductivity and modulating current. As the modulating current varies the incremental conductivity of the semiconductor elements, a corresponding reactive current is introduced into the frequency determining circuit whereby the carrier frequency of the oscillator is deviated from a reference or center value. The regenerative feedback path within the oscillator may incorporate a non-linear element to stabilize the loop gain at unity.

In one embodiment of the invention, a pair of semiconductor elements are arranged in a balanced circuit for temperature compensation. Such circuit is unbalanced by the modulating current to develop a control potential at the carrier frequency. This potential regulates the introduction of a corresponding reactive current into the frequency determining circuit of the oscillator to deviate the carrier frequency by changing the resonant frequency of the circuit. In additional embodiments, the semiconductor circuit elements are differently arranged for producing the control potential.

The invention will be better understood from the following detailed description, taken in conjunction with the accompanying drawings, in which.

Figure 1:
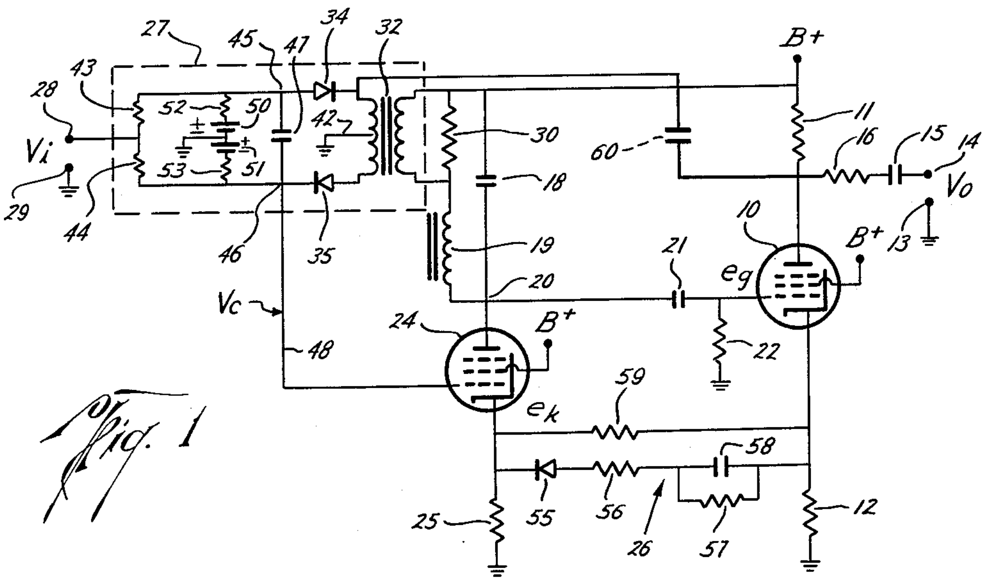
FIG. 1 is a schematic diagram of a frequency modulation system in accordance with the invention.

In FIG. 1 is shown a frequency modulation system comprising an oscillator output tube 10 which may be a vacuum tube of the pentode type having a cathode and anode for defining a current path and having control electrodes including a control grid, a screen grid and a suppressor grid spaced along the current path. Anode current is supplied to the tube 10 from a D.C. voltage source B+ through an anode resistor 11 connected to the anode and through cathode resistor 12 which connects the cathode to ground. An output potential $V_0$ may be derived by amplification from the oscillator output tube 10 between grounded terminal 13 and a terminal 14 coupled to the anode by capacitor 15 and resistor 16 in series. The oscillator tube 10 is thus connected in the manner of an output stage for a vacuum tube amplifier.

To provide a regenerative feedback circuit for producing oscillations having a stable center frequency and pure waveform, a capacitor 18 and an inductane 19 are connected in parallel as a tank circuit between the power supply terminal B+ and the control grid of the oscillator output tube 10, junction 20 of the inductance and capacitor being coupled by capacitor 21 and grid leak resistor 22 to the control electrode. Also connected to the junction 20 is the anode of an oscillator input tube 24, which may be similar to oscillator output tube 10. The cathode of the tube 24 is connected through cathode resistor 25 to ground so that the anode-cathode path of the tube 24 is connected in series with the inductance 19 and cathode resistor 25 between the B+ terminal and ground to derive D.C. anode current from the power supply. Thus, tube 24 is coupled with tube 10 in cascaded, grid-driving relation. A regenerative feedback circuit 26 coupled between the cathode circuits of the tubes 10, 24 serves to sustain oscillations at a stable level by driving the cathode of tube 24 in nonlinear response to the cathode follower output of tube 10.

In order to vary the carrier frequency of the oscillations about a center or reference value determined by parallel resonance of capacitor 18 and inductance 19, a modulating signal $V_i$ is applied at the input of a modulator circuit 27 to produce a control signal $V_c$ at the carrier frequency, but shifted in phase 90° from the tank circuit voltage. This control signal controls the flow of reactive current through the amplifying tube 24 and the tank circuit. The effective value of inductance 19 is thereby changed to deviate the carrier frequency. The modulating potential $V_i$ commonly is derived from a high impedance source having a frequency in the audio frequency range, including zero frequency, and is conveniently applied at input terminals 28, 29, terminal 29 being grounded. To supply the modulator circuit with a signal at the carrier frequency but shifted 90° in phase from the potential across the tank circuit, there is conveniently included in the branch of the tank circuit containing inductance 19, a low valued resistor 30 connected in series with the inductance 19. The potential in phase quadrature developed across the resistor 30 is applied to the high reactance primary winding of a transformer 32 to develop across the secondary winding of the transformer a potential at the carrier frequency in phase with current through the inductance 19. The modulator circuit 27 is therefore arranged to apply a reactive potential to the grid of tube 24 varying in magnitude in accordance with the input potential $V_i$. Tube 24 then draws a reactive current determined in magnitude by $V_i$.

In accordance with this embodiment of the invention, the modulator circuit 27 includes a pair of semiconductor circuit elements or diodes 34, 35 connected in balanced relation. These semiconductor elements may, for example, be silicon or germanium junction diodes or germanium diodes of the point contact type, but are more particularly characterized by a high degree of conformance over a wide operating range to the characteristic voltage-current relationship.

$$I=I_s\left(e^{\frac{FqV}{kT}}-1\right) \tag{1}$$

where I is the instantaneous current through the diode in amperes, $I_s$ is the theoretical reverse saturation current through the diode in amperes, $k$ is Boltzmann's constant ($1.38\cdot10^{-23}$), T is the absolute temperature in degrees Kelvin, $q$ is the charge $1.602\cdot10^{-19}$ coulombs on an electron, V is the voltage in volts across the diode, and F is a figure of merit characteristic of the diode. The figure of merit F is defined in terms of physical constants and measured diode parameters, as follows:

$$F\equiv\left(\frac{kT}{q}\right)\left(\frac{G}{i}\right)=\frac{\text{thermal energy}}{\text{observed energy}} \tag{2}$$

where $$G\equiv\frac{di}{dv}$$

the incremental conductivity observed at current $i$ in amperes.

For satisfactory operation in accordance with the invention, the figure of merit F should be constant over the desired operating range of current and temperature and should have a value approaching unity. Silicon junction diodes of good quality are currently produced having a figure of merit on the order of 0.8 or better. Germanium junction diodes having a figure of merit of 0.65 and germanium point contact diodes having a figure of merit of 0.60 have also been employed. It may be observed that the quality of semiconductor diodes for the purposes of this invention may be measured by the approach of the figure of merit to its limiting value unity, although the limiting value may be expressed as other than unity where the relationship (1) is modified or other units are employed. As the diodes are utilized in accordance with this invention, their incremental conductivity G is of considerable significance. By differentiation of the expression (1) with respect to the voltage V, the incremental conductivity G is found to be given as:

$$G=\frac{FC}{T}(I+I_s) \tag{3}$$

or $$G=\frac{FC}{T}\cdot I \tag{4}$$

amperes/volt or mhos where I is much greater than $I_s$, or $I_s$ is negligibly small, and the constant C is equal to the ratio $q/k$ or approximately 11,600 K. °/volt. It should be noted that $I_s$ is approximately an exponential function of temperature. Then I measured at constant voltage will approximate an exponential function of temperature.

With presently available silicon junction diodes, reverse saturation currents as low as $10^{-10}$ ampere may be obtained, so that the saturation current $I_s$ may be neglected even though the instantaneous current I is as low as $10^{-8}$ ampere, for example. It will be observed that the incremental conductivity is a direct linear function of the total instantaneous curent I and is inversely proportional to the absolute temperature T. The maximum instantaneous forward current I for operation of high quality semiconductor elements in accordance with the exponential relationship (1) may, for example, be $10^{-3}$ ampere. The maximum voltage across the element which corresponds to a total forward current on the order of a milliampere or fraction thereof is a fraction of a volt such as, for example, 0.6 volt. Germanium diodes generally operate at lower voltages and high currents than silicon diodes.

Figure 2:
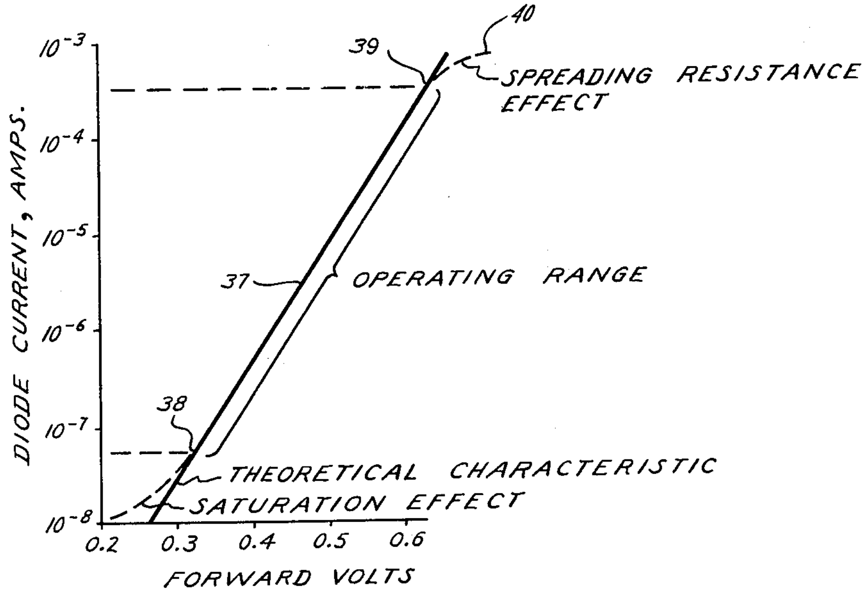
FIG. 2 is a graphical representation of typical characteristics of circuit elements employed in the system of FIG. 1.

The suitable operating range is represented graphically in FIG. 2 by the portion of the straight solid line 37 between points 38 and 39 where typical voltage-current characteristics represented by the dotted line 40 depart from the theoretically perfect exponential characteristics represented by the straight solid line 37. It may be noted that the scale of diode current is logarithmic, whereas the scale of forward volts is linear.

To utilize the variation in incremental conductivity while avoiding temperature dependence, the diodes 34, 35 of the modulator circuit of FIG. 1 are connected in a balanced relationship with respect to the sources of carrier current, bias current and modulating current. Thus, the secondary winding of transformer 32 has a center tap connection 42 to ground, and the terminals of the secondary winding are connected to the semiconductor elements. The input terminal 28 is similarly connected to the center tap of equal current dividing high valued resistors 43, 44. To provide a bridge circuit, resistor 43 is connected to semiconductor element 34 at junction point 45 and resistor 44 is connected to semiconductor element 35 at junction point 46, capacitor 47 being bridged on the diagonal between the junction points 45 and 46. The control grid of the amplifying tube 24 is connected to one of these junction points, such as point 46 by a conductor 48. With respect to the carrier current induced to circulate through the bridge circuit by the potential developed across secondary winding of transformer 32, the diodes 34, 35 are connected in similarly poled, series relation. At any instant, therefore, the carrier current passes through both diodes in the same sense, i.e., the forward or the reverse sense. However, with respect to the modulating current circulated through the legs of the bridge by application of a modulating potential $V_i$, the diodes 34, 35 are connected in oppositely poled relation. That is to say, at any instant, modulating current passes through one diode in the forward direction and through the other diode in the reverse direction.

In order that the total instantaneous current through the diodes is always maintained in the forward direction and of a magnitude lying within the operating range (FIG. 2), means are provided for passing a D.C. biasing current in the forward direction through both of the diodes 34, 35 at all times during the operation of the oscillator. To this end, there may be provided a pair of equal batteries 50, 51 or other D.C. sources having their junction connected to ground and having terminals of opposite polarity connected by equal current limiting resistors 52, 53 to the junction points 45, 46 of the bridge. Battery 50 is thus connected to pass a D.C. biasing current in the forward direction through diode 34, while battery 51 passes D.C. biasing current in the forward direction through diode 35.

In order to sustain the oscillations with amplitude stability over the range of frequency determined by the modulator circuit 27, regenerative feedback circuit 26 between the oscillator tube and the amplifying tube 24 has a gain decreasing with amplitude of the oscillations. This feedback circuit includes a rectifier 55 which may conveniently be a semiconductor diode poled for conducting current from the cathode circuit of amplifier tube 10 to the cathode circuit of amplifier tube 24 and connected between the cathodes of these tubes. It is noted that the cathode of tube 10 is more positive than the cathode of tube 24 in this example. Suitably connected in series with the rectifier 55 are A.C. and D.C. current limiting resistors 56 and 57, respectively, a by-pass capacitor 58 being connected across the D.C. current limiting resistor 57. Resistor 56 preferably has a value $R_{56}$ much less than resistor 57, and two or three times the initial diode resistance. To reduce the current required to pass through the rectifier 55, there may be connected in parallel between the cathodes a shunt resistor 59. The values of cathode resistors 12 and 25 are selected in relation to the anode current through the respective tubes so that a small D.C. potential is normally impressed across diode 55 in the direction of easy conduction. Separate bias current sources may be used, if desired, to produce this D.C. potential.

In an exemplary operation of the frequency modulation system illustrated in FIG. 1, oscillations are initiated upon application of anode voltage due to transients or thermal noise voltages. As oscillations build up due to a loop gain in excess of $1+j0$ at the LC resonant frequency, the A.C. level across diode 55 exceeds the bias potential. The diode then becomes a non-linear resistor, varying in value with the instantaneous potential of the carrier. If the carrier level is very low, the net impedance in the feedback path 26 is $$\frac{1}{G}+R_{56}$$

in parallel with resistor 59. Resistor 59 may be omitted or set such that the loop gain is always less than $1+j0$ when diode 55 is disconnected. Bias current through resistor 57 or an external source is such as to make $$\frac{1}{G}$$

in the range of 1,000 to 100,000 ohms when the diode is connected and carrier level is low. At low carrier levels the loop gain must exceed $1+j0$. If the carrier level is high, diode 55 conducts for approximately ½ cycle. The energy relationship around the loop must then be set so that the loop gain as a function of time integrated over one carrier cycle is less than $1+j0$. Inductance 19 and capacitor 18 act to store energy and permit good sine wave output voltages while using this non-linear carrier AGC system. It is noted that resistor 56 sets a threshold on the minimum feedback path impedance. Large carrier levels giving very low $$\frac{1}{G}$$

diode instantaneous resistances cannot produce a path resistance through network 26 less than $R_{56}$ in parallel with resistor 59.

Assuming that the modulating potential $V_i$ applied at the input terminals is initially zero, the output potential $V_o$ derived from the amplifier tube 10 has a center frequency determined by the passive circuit elements and primarily by the capacitor 18 and inductance 19. The oscillations are stabilized by the energy transferred degeneratively from the anode circuit of the amplifier tube 10 to the grid-cathode circuit via the tank circuit provided by the capacitor and inductance, i.e. by LC tank losses. Additionally, energy transmitted via the positive feedback circuit 26 from the oscillator tube to the amplifier tube 10 is required to sustain oscillations. However, because the rectifier or diode 55 is included in the feedback loop 26, the gain of the feedback loop falls off with increasing feedback signals due to clipping of negative peaks of the feedback signal having an excursion in excess of the positive bias potential developed across the diode. When the level of oscillations results in a positive feedback loop gain through the diode 55 which just offsets the losses in the tank circuit, the oscillations are sustained at a stable level. Thus, an increase in the level of oscillations beyond this point decreases the positive feedback loop gain and thereby tends to reduce the level of oscillations, whereas a decrease in the level of oscillations tends to increase the positive feedback loop gain, thereby to restore the level of oscillations to a stable value. Network 26 then acts as an AGC element.

With no modulating potential applied to the input terminals 28, 29, each of the semiconductor elements 34, 35 passes the same carrier current and the same bias current, the value of the bias current being sufficient to place the superimposed alternations of the carrier current within the operating range as described in conjunction with FIG. 2. Hence, the incremental conductivity of each of the semiconductor elements 34, 35, will be the same and the circuit of a modulator 27 is balanced with no potential at the carrier frequency being developed at the junction point 46 of the bridge. Consequently, no signal at the carrier frequency is applied to the control grid of the reactance tube 24 and no deviation in the carrier frequency results.

Assuming now that a positive modulating potential is applied at the input terminals, the total forward current through the semiconductor element 34 is increased, while that through the semiconductor element 35 is decreased. Accordingly, the incremental conductivity for the diode 34 increases and that for diode 35 decreases so that the bridge becomes unbalanced. The potential at the junction point 46 with respect to ground which is thus produced is at the carrier frequency and has a phase corresponding to the phase of the potential across the half of the secondary transformer winding which is connected to the diode 34. Had a negative modulating potential been applied to the input terminals, a control potential would have been developed at the point 46 with respect to ground having the opposite phase, that is, the phase of the potential developed across the half of the secondary winding which is connected to the diode 35. The magnitude of the control potential is a linear function of the modulating signal because the difference in the incremental conductivities of the diodes 34, 35 is a linear function of the modulating current passing through them. When the modulating potential has an alternating wave form, the control potential is full-wave modulated in linear correspondence with the modulating potential, as may readily be demonstrated. The phase of the potential across low valued resistor 30 is 90° phase shifted from the potential across the LC circuit. Thus, all modulator signals derived from modulator 27 are ±90° in phase.

In accordance with the phase of the control potential $V_c$ applied to the control grid of the amplifying tube 24, the amplified version of this control potential developed at the anode of the amplifier tube 24 with respect to ground results in a reactive current and operates to increase or decrease the effective inductance in the tank circuit, thereby to lower or raise the frequency of the carrier with respect to its reference or center value. In this connection, it will be noted that the control potential $V_c$ applied to the grid-cathode circuit of the tube 24 is in phase quadrature with respect to the regenerative signal applied via diode 55 to the cathode of tube 24. The tube 24 thus serves as a reactance tube by introducing a version of the modulating signal into the tuned circuit which corresponds with an effective change in the inductance of the circuit. By including resistor 25 in the cathode circuit of the reactance tube 24, the transconductance $g_m$ of the tube 24 is maintained highly constant over the range of variation of control potential $V_c$. Because linearity is accurately maintained in the modulator circuit 27 and in the operation of the tube 24, a correspondingly high linearity is achieved over a wide frequency band. Since both tube 24 and tube 10 are at all times operated as constant gain amplifier stages with large effective negative feedback factors, changes in B+ or heater voltages, temperature or ageing do not materially alter the deviation gain or unmodulated center frequency. Balanced arrangement of modulator 27 very nearly cancels temperature variations which otherwise might act to change center frequency and/or deviation gain.

Thus, because the semiconductor elements 34, 35 are connected in balanced relation, changes in their operating temperature do not appreciably affect the modulated control potential $V_c$ or the carrier frequency. Assuming, for example, that temperature increases, the incremental conductivity of each element decreases in inverse proportion, following the same relationship given by expression (3). Since the biasing currents and modulating currents through the semiconductor elements are determined by resistors 52, 53 and 43, 44, only the carrier current through the elements changes with temperature. However, the same current flows through each element and therefore produces the same change in the voltage across the elements for a given change in temperature. Accordingly, the control potential $V_c$, which depends upon a difference in the voltages across the elements, is not influenced by temperature variations. Within a temperature range of at least −55° C. to 100° C., satisfactory operation may thus be obtained.

The choice of the circuit elements employed in the system in FIG. 1 is subject to wide variation. Merely to exemplify the practice of the invention and not in restriction of its scope, the following set of values is given for operation with a central carrier frequency of about 10 kilocycles.

| | |
|---|---|
| Pentodes 10, 24 | 5840 tubes. |
| Diodes 34, 35, 55 | Raytheon IN300. |
| Resistors 22, 43, 44, 52, 53, 57 | 1 megohm. |
| Resistors 11, 56, 59 | 10 kilohms. |
| Resistor 12 | 2,000 ohms. |
| Resistor 25 | 1,000 ohms. |
| Resistor 30 | 500 ohms. |
| Capacitance 18 | .001 uf. |
| Inductance 19 | 200 mH. |
| Anode supply voltage | 150 volts. |
| Modulating potential | ±2.5 volts. |
| Battery potential 50, 51 | 6 volts. |
| Transformer 32 | Line to line—500Ω—low phase shift at 10 kc. |

With the foregoing parameters, a frequency deviation of 7½% may readily be achieved with a linearity better than ±1% and less than 1% FBW zero drift when the diodes experience a temperature excursion from −55° C. to +100° C. Total temperature zero drift is largely a function of the thermal stability of inductance L19 and capacitance 18. This can be held to ±1% FBW per 50° C. with proper techniques.

To extend the range of frequency deviations while retaining high linearity, a capacitor 60 illustrated in FIG. 1 may be connected between the anode of the oscillator tube 10 and the appropriate terminal of the secondary winding for transformer 32. With a suitable value of capacitor 60, the desired linearity is achieved using the parameters tabulated above. For proper operation, the signal injected in the modulator via capacitor 60 is substantially less than the signal derived from the secondary of transformer 32.

Figure 3:
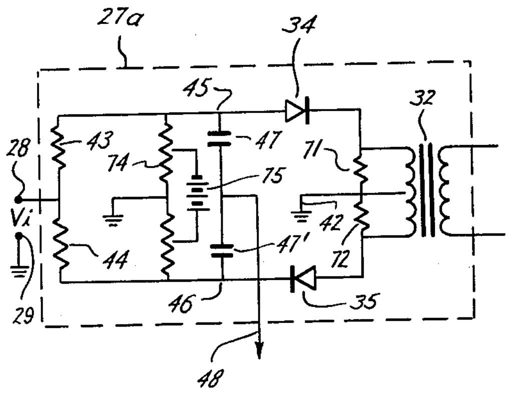
FIG. 3 is a schematic diagram of a modulator circuit which may be employed in lieu of modulator circuit of FIG. 1.

Both the oscillator and modulator portions of the system are subject to considerable variation within the scope of the invention. Thus, in FIG. 3 is shown a modulator circuit 27*a* which may be substituted for the modulator circuit 27 of FIG. 1. The modulator circuit 27*a* includes a pair of equal voltage divider resistors 71, 72 connected across the terminals of the secondary winding for transformer 32 and having their junction grounded. A pair of capacitors 47, 47′ are series connected between the junction points 45, 46 of the bridge. The conductor 48 then connects the control grid of tube 24 with the junction of capacitors 47, 47′. To provide a modified source of biasing current, a potential dividing resistor 74 having its center tap connected to ground is connected between the junction points 45 and 46. A single battery 75 has its terminals connected at points along the resistor 74 intermediate the terminals and midtap of the resistor to supply equal forward currents to the diodes 34 and 35. In other respects, the modulator circuit 27*a* is similar to the circuit 27 and its operation is substantially the same as that described above.

Figure 4:
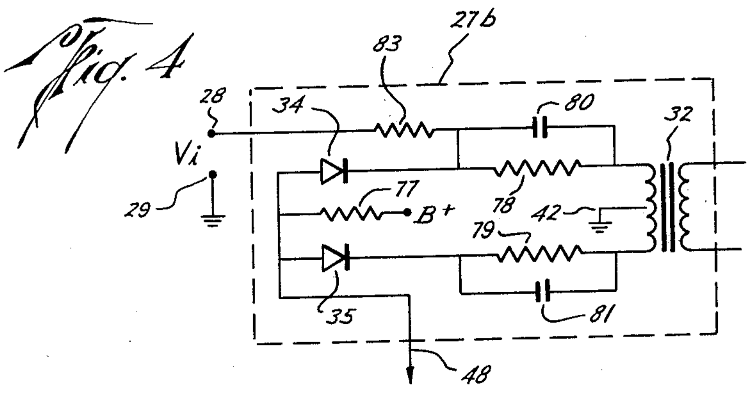
FIG. 4 is a schematic diagram of another form of modulator circuit.

In order that the biasing currents may be supplied from a source having a single polarity with respect to ground, a modulator circuit 27*b* as illustrated in FIG. 4 may be employed. The diodes 34 and 35 are here connected in the same sense in parallel circuits between the positive terminal B+ of the bias voltage supply and the ground connection 42 for the secondary winding of transformer 32. That is, the diodes 34 and 35 are connected to divide the forward biasing current between them, the total biasing current being maintained substantially constant by a high-valued resistor 77 connected in series between the B+ terminal and the junction of the parallel diode circuits. Connected in each of the parallel circuits in series between the corresponding diode and terminal of the secondary winding for transformer 32 are equal high valued resistors 78, 79 shunted by capacitors 80, 81. In order to unbalance the parallel circuits in accordance with the modulation potential $V_i$, the input terminal 28 is connected by current limiting resistor 83 to the junction of the diode 34 and corresponding resistor 78.

When the modulator circuit 27*b* is connected with the oscillator portion of the frequency modulating system shown in FIG. 1, a low level carrier current is induced to pass, at any instant, through one of the diodes 34, 35 in the forward direction and through the other in the reverse direction. While the diodes are maintained in their operating range (FIG. 2) by the flow of forward biasing current from the constant current source connected with the terminal B+, the incremental conductivity of the diodes is changed differentially in accordance with the modulating potential $V_i$ by injection of the modulating current through one of resistors 78, 79 so as to upset the balance of biasing currents in the parallel circuits and produce an opposite change of current through the other resistor. Thus, application of a positive modulating potential to terminal 28 increases the flow of D.C. current through resistor 78 and thereby reduces the flow of biasing current through the diode 34 to reduce its incremental conductivity. Since, however, the total biasing current remains constant, the biasing current through diode 35 increases, thereby increasing the incremental conductivity of the diode. The result of unbalancing the incremental conductivities of the diodes is production of a potential at the junction of the parallel diode circuits at the carrier frequency, which potential is employed to control the operation of the reactance tube 24 in the same manner as described above in conjunction with FIG. 1.

Figure 5:
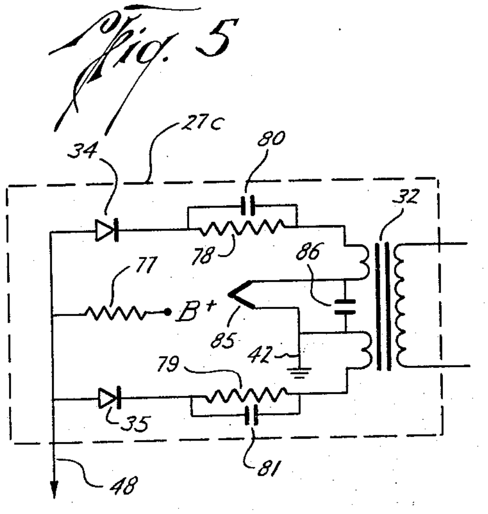
FIG. 5 is a schematic diagram of yet another form of modulator circuit.

In the embodiment of FIG. 5, provision is made for directly utilizing the potential developed by thermocouple 85 to produce a linear deviation in the oscillator frequency. A modulator circuit 27*c* is provided in accordance with this embodiment utilizing the diodes 34, 35 in a manner similar to that described in connection with FIG. 4. To introduce the potential developed by the thermocouple 85, the thermocouple is connected in series with the secondary winding of transformer 32 between the grounded midtap of one-half the winding and the corresponding terminal of the other half winding. To by-pass carrier frequency signals, a capacitor 86 is connected across the terminals of the thermocouple 85. Reducing the values of resistors 78 and 79 acts to increase the deviation gain at some sacrifice in center frequency stability.

In an exemplary operation of the frequency modulation system of this invention utilizing the modulator circuit of FIG. 5, the thermocouple 85 is positioned at a point where temperature measurements are to be made. Since the thermocouple is connected in unbalanced relation with respect to ground, the potential which it supplies to the modulator circuit will serve to modulate the control potential coupled via conductor 48 to the grid of reactance tube 24 by unbalancing the flow of biasing current through the respective diodes 34 and 35, in a manner similar to that described in conjunction with FIG. 4. Since the modulation of the control potential applied to the reactance tube effects a linear deviation in the carrier frequency of the oscillator, such deviation accurately corresponds with the temperature at the measurement point. Balanced arrangements using two thermocouples may be utilized or the thermocouples may be eliminated and one diode alone used as a temperature sensing element of considerable sensitivity.

The source of modulating potential may alternatively be supplied, for example, from a strain gage bridge, an accelerometer, or other suitable transducer. Any of the modulator circuits may be employed with the oscillator circuit of FIG. 1, as well as with a variety of other oscillator circuits of suitable design. In such oscillator circuits, transistors may be employed in lieu of vacuum tube amplifying devices with suitable rearrangements of the associated circuitry. Bridge circuits may be employed as the modulator portion of the system, which include a second pair of semiconductor circuit elements connected in the other legs of the bridge and poled with respect to biasing currents for operation in the range indicated in FIG. 2 where incremental conductivity is directly proportional to the current through the element.

As the invention is susceptible to these and other modifications, it is not to be limited to the several embodiments illustrated and described but is of a scope defined in the appended claims.

I claim:

1. In a frequency modulation system, the combination comprising an oscillator arranged to produce a carrier signal, and modulating means including at least one semiconductor circuit element having a forward operating range wherein its incremental conductivity varies linearly with current therethrough, means providing a circuit for conducting modulating current through said element to vary its incremental conductivity, means for passing direct current through said element to maintain forward conduction therethrough in said operating range, and means for coupling said element with said oscillator to vary the frequency thereof as a linear function of the incremental conductivity of said element.

2. In a frequency modulation system, the combination comprising an oscillator arranged to produce a carrier signal, and modulating means including a pair of semiconductor circuit elements each having a forward operating range wherein its incremental conductivity varies linearly with current therethrough, means providing a circuit for conducting modulating current through at least one of said elements to vary its incremental conductivity, means for passing direct current through said elements to maintain forward conduction therethrough in said operating range, and means for coupling said elements with said oscillator to vary the frequency thereof as a linear function of the incremental conductivities of said elements.

3. In a frequency modulation system, the combination comprising an oscillator arranged to produce a carrier signal, and modulating means including a pair of semiconductor circuit elements each having a forward operating range wherein its incremental conductivity varies linearly with current therethrough, means providing a circuit for conducting modulating current through at least one of said elements to vary its incremental conductivity, means for passing direct current through said elements to maintain forward conduction therethrough in said operating range, and means for coupling said elements with said oscillator to pass current through said elements at the carrier frequency which is at least an order of magnitude smaller than said modulating current, said oscillator being responsive to variations in the potential developed across said elements at the carrier frequency for varying the carrier frequency.

4. In a frequency modulation system, the combination comprising an oscillator arranged to produce a carrier signal and having a frequency determining circuit, and modulating means including a pair of semiconductor circuit elements each having a forward operating range wherein its incremental conductivity varies linearly with current therethrough, means connecting said elements in a balanced circuit for conducting modulating current through said elements in opposed relation to vary their incremental conductivity oppositely from a balanced condition, means for passing direct current through said balanced circuit to maintain forward conduction through said elements in said operating range, and means for coupling said balanced circuit with said frequency determining circuit to pass a current through said elements at the carrier frequency which is at least an order of magnitude smaller than the amplitude of said modulating current, said oscillator being responsive to variations in the potential developed across said balanced circuit at the carrier frequency for varying the frequency of the carrier signal produced by said oscillator.

5. In a frequency modulation system, as defined in claim 4, the combination including means for maintaining the total direct current passed through said elements substantially constant.

6. In a frequency modulation system, the combination comprising an oscillator for producing a carrier signal, and modulating means including a pair of semiconductor circuit elements each having a forward operating range wherein the current passed through it is an exponential function of the voltage thereacross, circuit means for passing substantially equal portions of a substantially constant biasing current through said elements within the forward operating range of each element, means for applying a modulating potential to said circuit means to produce corresponding but opposite variations in the current through said elements, and means for coupling said circuit means with said oscillator to pass a relatively small current at the carrier frequency through said elements and to vary the carrier frequency linearly with changes in said modulating potential.

7. In a frequency modulation system, the combination comprising an oscillator having reactances arranged in a tuned circuit to determine the center frequency of a carrier signal and a reactance varying device coupled with said circuit and responsive to a control signal for correspondingly deviating the carrier frequency, and modulating means including a pair of semiconductor circuit elements each having a forward operating range wherein its incremental conductivity varies linearly with current therethrough, circuit means for passing substantially equal portions of a substantially constant biasing current through said elements within the forward operating range of each, means for applying a modulating potential to said circuit means to produce corresponding but opposite variations in the current through said elements, and means for coupling said circuit means with said oscillator to pass a relatively small current at the carrier frequency through said elements to produce a control signal for application to said reactance varying device.

8. In a frequency modulation system, the combination comprising an oscillator including a capacitor and an inductance in parallel forming a tuned degenerative feedback circuit, and an amplifying device connected as a variable reactance in a positive feedback circuit for sustaining oscillations of a carrier signal, a pair of semiconductor circuit elements each having a forward operating range wherein its incremental conductivity varies linearly with current therethrough, circuit means for passing substantially equal portions of a substantially constant biasing current through said elements within the forward operating range of each, means for applying a modulating potential to said circuit means to produce corresponding but opposite variations in the current through said elements, means for coupling said circuit means with said tuned circuit to pass a current in phase quadrature with the carrier signal through said elements to produce a control signal, and means for applying said control signal to said amplifying device to vary the carrier frequency by changing its effective reactance.

9. In a frequency modulation system, the combination comprising an oscillator producing a carrier signal, and modulating means including a pair of semiconductor circuit elements each having a forward operating range wherein its incremental conductivity varies linearly with the current therethrough, balanced circuit means for conducting substantially equal biasing currents through the respective elements within their forward operating range, means for applying a modulating potential to said circuit means to pass equal modulating currents through said elements in opposite directions, thereby to produce opposite variations in the incremental conductivity of said elements, and means for coupling said circuit means with said oscillator to pass a relatively small current at the carrier frequency through said elements in the same direction and to vary the carrier frequency linearly with changes in said modulating potential.

10. In a frequency modulation system, the combination comprising an oscillator producing a carrier signal, and modulating means including a pair of semiconductor circuit elements each having a forward operating range wherein its incremental conductivity varies linearly with current therethrough, circuit means for passing substantially equal portions of a substantially constant biasing current through said elements within their forward operating range, means for applying a modulating potential in unbalanced relation to said circuit means to produce corresponding but opposite variations in the current through said elements, and means for coupling said circuit means with said oscillator to pass a relatively small current at the carrier frequency through said elements in opposite directions and to vary the carrier frequency linearly with said changes in said modulating potential.

11. In a frequency modulation system, the combination as defined in claim 10 wherein said potential applying means includes a thermocouple, whereby deviations in the carrier frequency correspond with temperature variation in the vicinity of said thermocouple.

12. In a frequency modulating system, the combination comprising an oscillator including a capacitor and an inductance in parallel forming a tuned degenerative feedback circuit, an amplifying device having a control electrode and connected as a variable reactance in a positive feedback circuit for sustaining oscillations of a carrier signal, a pair of semiconductor circuit elements each having a forward operating range wherein its incremental conductivity varies linearly with current therethrough, balanced circuit means arranged to promote the flow of substantially equal biasing currents through said elements within their forward operating range, means for applying a modulating potential to said circuit means to produce corresponding but opposite variations in the current through said elements, means responsive to current flowing through said inductance for passing a relatively small current of corresponding phase through said elements to produce a control signal linearly dependent upon said modulating potential, and means for applying said control signal to the control electrode of said amplifying device to vary the carrier frequency by changing its effective reactance.

13. In a frequency modulation system, the combination comprising an oscillator including an amplifying device having an anode, a cathode and a control electrode, a capacitor and an inductance in parallel forming a tuned degenerative feedback circuit between said anode and said control electrode, a second amplifying device including an anode, a cathode and a control electrode and having its anode coupled to the control electrode of said first amplifying device, means for coupling the cathodes of said amplifying devices together to provide a positive feedback circuit for sustaining oscillations of a carrier signal, a pair of semiconductor circuit elements each having a forward operating range wherein its incremental conductivity varies linearly with current therethrough, balanced circuit means for passing substantially equal biasing currents through said elements within the forward operating range thereof, means for applying a modulating potential to said circuit means to produce corresponding but opposite variations of the current through said elements and in their incremental conductivities, means responsive to the current flowing through said inductance for passing a relatively small current of corresponding phase through said elements to produce a control signal varying with said incremental conductivity, and means for applying said control signal to the control electrode of said second amplifying device to vary the carrier frequency by changing its effective reactance.

14. In a frequency modulation system, the combination as defined in claim 13, wherein said coupling means includes an asymmetrically conductive device poled for conduction of current from the cathode circuit of said first amplifying device to the cathode circuit of said second amplifying device for decreasing the gain of the regenerative feedback circuit in response to increases in said carrier signal.

15. In a frequency modulation system, the combination comprising an oscillator including a first amplifying device having an anode, a cathode and a control electrode, an anode resistor and a cathode resistor for connecting the anode and cathode of said first amplifying device across a source of anode current, a second amplifying device having an anode, a cathode and a control electrode, a capacitor and an inductance in parallel forming a tank circuit for connecting the anode of said second amplifying device to the positive terminal of said anode current source, a second cathode resistor for connecting the cathode of said second amplifying device to the other terminal of said anode current source, a series capacitor and a shunt grid-leak resistor for coupling the anode of said second amplifying device to the control grid of said first amplifying device, a regenerative feedback circuit including a diode rectifier connected between said cathodes in a direction to pass current from the cathode circuit of said first device to the cathode circuit of said second device, a bridge circuit including a pair of semiconductor circuit elements connected in respective branches thereof, each of said elements having a forward operating range wherein its incremental conductivity varies linearly with current therethrough, a pair of equal resistors connected in the remaining respective branches of said bridge circuit, a high impedance source of biasing current connected between the junction points for said resistors and elements to maintain forward conduction through said elements in said operating range, means for applying a modulating potential between the remaining junction points for said resistors and elements to pass a modulating current through each of said elements, a by-pass capacitor being connected between said remaining junction points, said elements being connected in oppositely poled relation with respect to said modulating currents, whereby the incremental conductivities of said elements are oppositely changed in proportion to said modulating currents, and means responsive to the current flow through said inductance for passing a current of like phase through said elements and said by-pass capacitor, and means for coupling a terminal of said by-pass capacitor with the control electrode of said second amplifying device to apply a control potential therethrough corresponding to said modulating potential and serving to vary the carrier frequency of said oscillator linearly with said modulating potential.

16. In a frequency modulation system, the combination as defined in claim 15, including a capacitor connected between the anode of said first amplifying device and a point in said bridge circuit unbalanced with respect to ground for injecting a current in said bridge circuit opposite in phase and of lesser magnitude with respect to the current circulated through said elements in response to the current through said inductance.

References Cited in the file of this patent

UNITED STATES PATENTS

| | | |
|---|---|---|
| 2,555,959 | Curtis | June 5, 1951 |
| 2,708,739 | Bucher | May 17, 1955 |
| 2,788,446 | Cerveny et al. | Apr. 9, 1957 |
| 2,814,020 | Bouwman et al. | Nov. 19, 1957 |
| 2,852,747 | Davis | Sept. 16, 1958 |
| 2,854,651 | Kircher | Sept. 30, 1958 |